(12) United States Patent
Engstrom et al.

(10) Patent No.: US 6,199,197 B1
(45) Date of Patent: Mar. 6, 2001

(54) APPARATUS AND METHOD FOR PROVIDING COMMON BEHAVIOR ACROSS DIFFERENT PROCESSING LEVELS IN AN OBJECT ORIENTED FRAMEWORK

(75) Inventors: Jan Olof Engstrom, Stockholm (SE); Timothy James Graser, Rochester, MN (US); Barbara Regine Proske, Köln (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,718

(22) Filed: Sep. 29, 1998

Related U.S. Application Data

(63) Continuation-in-part of application No. 09/038,024, filed on Mar. 11, 1998, now Pat. No. 6,106,569.

(51) Int. Cl.[7] .................................................. G06F 9/45
(52) U.S. Cl. .................... 717/2; 717/1; 709/315
(58) Field of Search ...................... 717/2, 1, 11; 709/315

(56) References Cited

U.S. PATENT DOCUMENTS 5,987,423 * 11/1999 Arnold et al. .......................... 705/14
6,023,578 * 2/2000 Birsan et al. ............................ 717/2

OTHER PUBLICATIONS

Mattsson. Framework integration problems, causes, solutions. ACM. pp. 81–87, Oct. 1999.*
Riehle. Role model based framework design and integration. ACM. pp. 117–133, Aug. 1998.*
Froehlich. Hooking into object–oriented application frameworks. ACM. pp. 491–501, Sep. 1997.*

* cited by examiner

*Primary Examiner*—Mark R. Powell
*Assistant Examiner*—Wei Zhen
(74) *Attorney, Agent, or Firm*—Martin & Associates, LLC; Derek P. Martin

(57) ABSTRACT

In an object oriented computer system, a framework mechanism defines behavior that may be accessed by different processing levels in the framework. A shared policy corresponding to the behavior is defined. A policy usage view is defined that includes one or more methods for accessing attributes required by the shared policy. A view adapter is also defined that provides an implementation for invoking the methods on the policy usage view. When a processing level needs the behavior defined by the shared policy, the methods on the view adapter are invoked, which retrieve the required attributes for the shared policy.

5 Claims, 7 Drawing Sheets

APPARATUS AND METHOD FOR PROVIDING COMMON BEHAVIOR ACROSS DIFFERENT PROCESSING LEVELS IN AN OBJECT ORIENTED FRAMEWORK

This application is a Continuation-In-Part of "A Method of Developing a Software System Using Object Oriented Technology", U.S. Ser. No. 09/038,024, filed Mar. 11, 1998, now U.S. Pat. No. 6,106,569 which is incorporated herein by reference.

BACKGROUND OF THE INVENTION

1. Technical Field

This invention generally relates to object oriented programming and more specifically relates to an apparatus and method that allows mechanisms at different levels in an object oriented framework to access common behavior in the framework.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerfull and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. Some frameworks define various different levels of processing that must occur. An example of such a framework is an order processing framework that defines orders and order details. Assuming the framework allows for trasnsactions in different currencies, the framework will need to provide an exchange rate calculation at both the order level and at the order detail level. One solution is to provide different exchange rate calculations for each level. This solution is undesirable because it duplicates the code required to perform the exchange rate calculation, and it requires that the code be changed twice when the exchange rate calculation is updated. In addition, this could possibly lead to calculating the exchange rate one way at the Order level, and a different way at the Order Detail level. It would be preferable to have behavior, such as the exchange rate calculation, that could be used by different processing levels of the framework.

One way to allow common behavior at different processing levels in an object oriented framework is to provide a common base class for the different order levels. This solution is undesirable because it is not consistent with objective of defining levels in the framework according to the specific domain in which the framework is used. In addition, providing a common base class can lead to class definitions in the framework that are too restrictive and do not allow a user extending the framework the flexibility needed to program certain features in a software application. Extending the framework might then require changes to classes that the application does not own or have access to.

Without a way to provide support for common behavior on multiple levels in an object oriented framework without the drawbacks of known solutions, the power and flexibility of object oriented frameworks will be limited.

DISCLOSURE OF INVENTION

In an object oriented computer system, a framework mechanism defines behavior that may be accessed by different processing levels in the framework. A shared policy corresponding to the behavior is defined. A policy usage view is defined that includes one or more methods for accessing attributes required by the shared policy. A view adapter is also defined that provides an implementation for invoking the methods on the policy usage view. When a processing level needs the behavior defined by the shared policy, the methods on the view adapter are invoked, which retrieve the required attributes for the shared policy.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
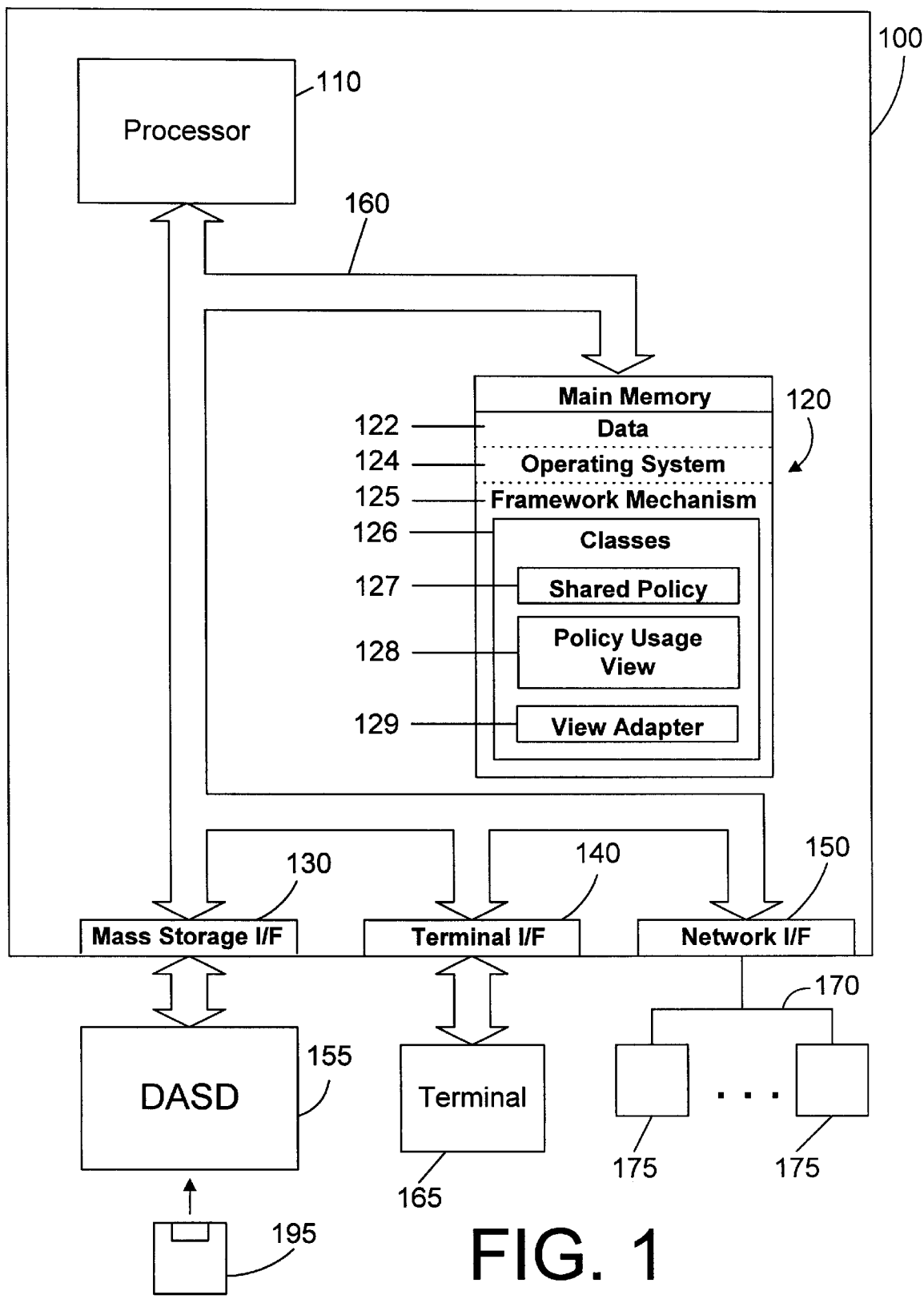
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requester of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core fiction and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (ie., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible fiction.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IRM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail the object logically appears to be a member of the OrderDetail class. This ability to dynamically modify the behavior of objects at run-time is one of the powerfull concepts supported in the San Francisco framework.

Figure 2:
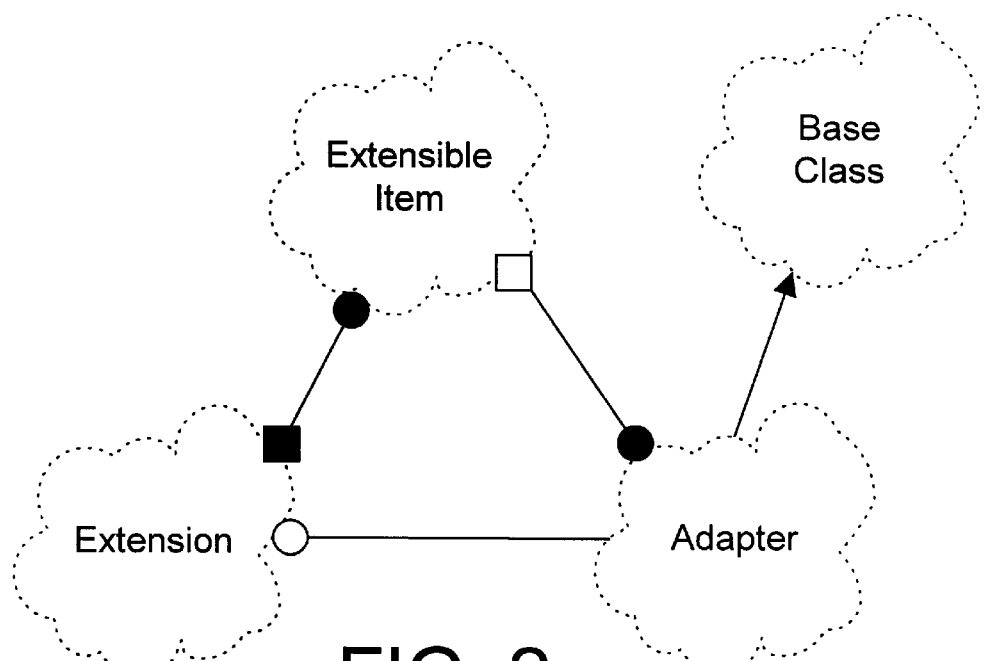
FIG. 2 is a class diagram of an extensible item and its related classes.

The class diagram of FIG. 2 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "using" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object. The Adapter class is provided to allow an ExtensibleItem object owning an object of the given Extension class to be treated as a true instance of the BaseClass by invoking methods on an adapter object that corresponds to the ExtensibleItem rather than by invoking methods directly on the ExtensibleItem itself.

Figure 3:
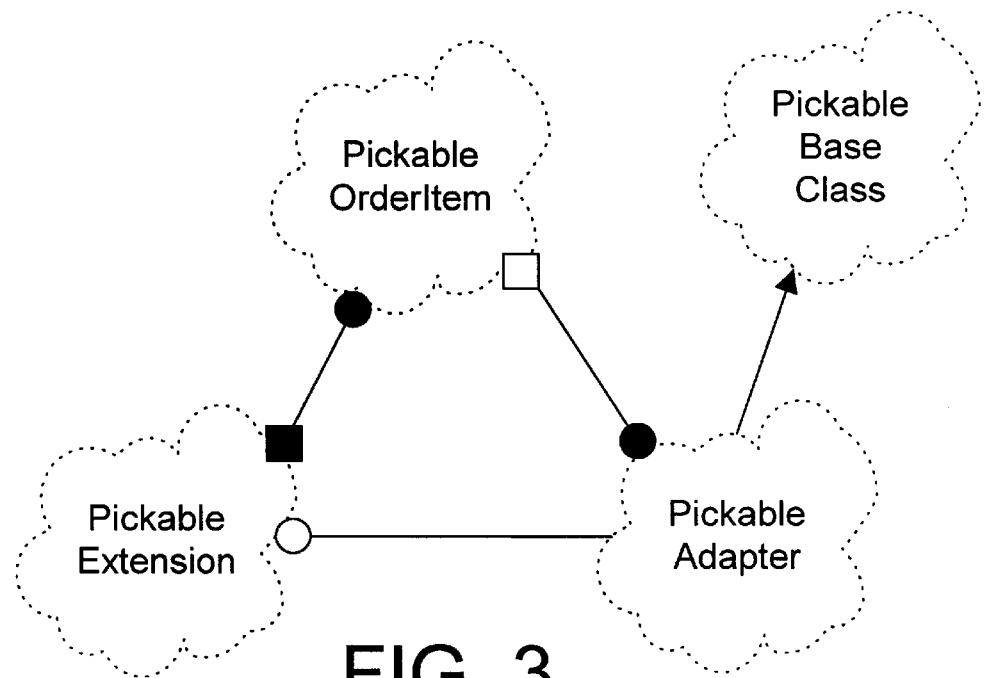
FIG. 3 is a class diagram of one specific example of an extensible item.

A specific example helps to illustrate the concepts of domain-specific extensions to a domain-neutral object. Let's assume there is a need for a "pickable" order item. Referring to FIG. 3, a PickableOrderItem class represents a domain-neutral extensible item, and includes an instance of a PickableExtension class, which extends the PickableOrderItem for use in a specific domain that requires objects that are pickable. A PickableAdapter class has a reference to the PickableOrderItem class, and supports the interface of the PickableBaseClass. The class configuration of FIG. 2, as illustrated in the specific example of FIG. 3, allows extensions to be dynamically added to and deleted from an extensible item object as the desired fiction of the object changes.

Figure 4:
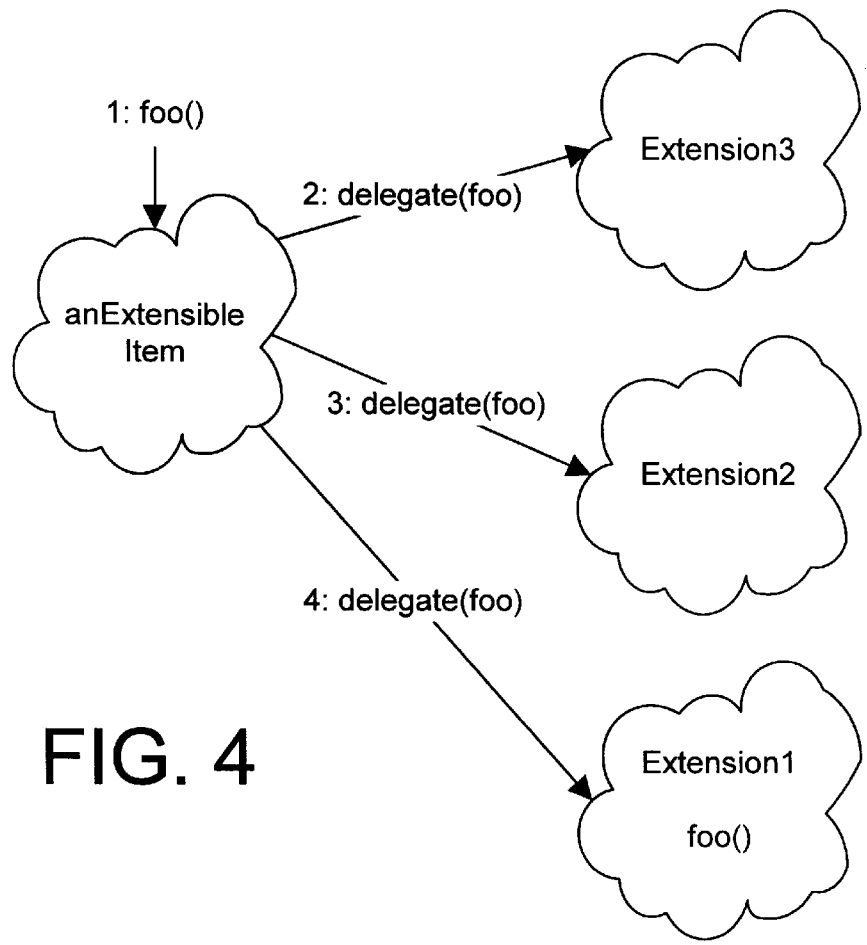
FIG. 4 is an object diagram illustrating the delegation of method calls to extension objects.

An instance of the ExtensibleItem class can service method calls in a number of different ways. Referring to FIG. 4, an instance an ExtensibleItem has three associated extensions, Extension3, Extension2, and Extension1. One way for an ExtensibleItem to service a method call is to determine which extension can handle the method call, progressing from the newest (Extension3) to the oldest (Extension1). For example, we assume that Extension1 supports a method called "foo", and that "foo" is invoked on an ExtensibleItem (step 1). The an ExtensibleItem object first delegates the "foo" method to Extension3 (step 2). Extension3 does not support the method, so an ExtensibleItem delegates the call to "foo" to the next extension, Extension2 (step 3). Extension2 does not support the "foo" method, so an ExtensibleItem delegates the call to "foo" to Extension1 (step 4). Extension1 supports "foo", so Extension1 executes its "foo" method in response to an ExtensibleItem delegating "foo" to Extension1 in step 4. Note that the first extension to support the "foo" method will execute its "foo", and other implementations of "foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that it's interface supports, as shown in FIG. 4. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensionItem.

Figure 5:
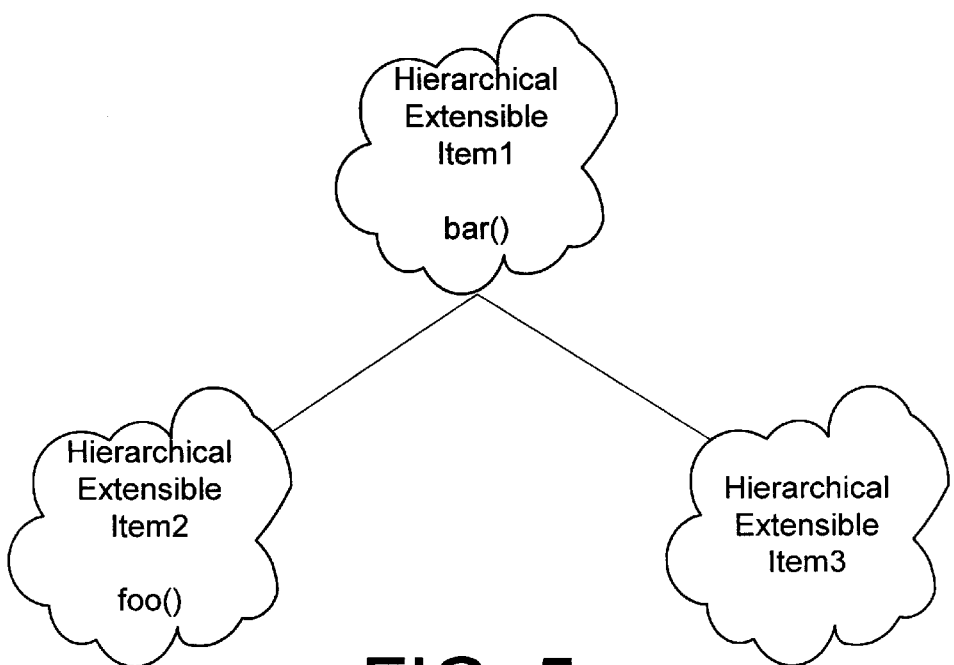
FIG. 5 is an object tree for illustrating the delegation of method calls to parent and children objects in an object tree.

If an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 5, a very simple tree structure is provided to illustrate the delegation of method calls from one object in a tree structure to another. We assume that a class HierarchicalExtensibleItem is a subclass of ExtensibleItem that enhances ExtensibleItem by adding behavior to explicitly allow invoking methods in either a "drill up" or "drill down" fashion. HierarchicalExtensibleItem1 is an instance of the HierarchicalExtensibleItem class and is at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 5), and stop there. This concept of upwards and downwards delegation of method calls can be extended indefinitely throughout a tree structure of ExtensibleItems.

Extensible items thus provide a powerful and dynamic way to change the interface for an object at run-time so the object can acquire and tailor its domain-specific behavior as required. The concept of extensible items discussed above is the foundation upon which the present invention is built.

2. Detailed Description

According to a preferred embodiment of the present invention, an apparatus and method provide common behavior among multiple levels in an object-oriented framework. The framework defines extensible items that own one or more extensions, as discussed above with respect to IBM's San Francisco framework. Each extensible item has a corresponding adapter that is used to access the methods on the extensible item. The framework defines an abstract policy usage view class that defines abstract methods for accessing attributes that the common behavior needs to access. Thus, the common behavior of the framework can rely on methods for accessing attributes without regard to the underlying mechanisms that access these attributes. The framework also defines a view adapter class that is a subclass of both the extensible item adapter class and the policy usage view class. This policy view adapter class thus provides an implementation that a shared policy may use to provide common behavior at different levels in the framework.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes multiple pre-defined classes 126, including a shared policy class 127, a policy usage view class 128, and a view adapter 129. Shared policy class 127 defines common behavior that needs to be available to different levels of the framework 126. The PolicyUsageView class is an abstract class that defines methods that access attributes required by the shared policy 127. The ViewAdapter class is a special type of adapter that the SharedPolicy uses to access the attributes it requires.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (ie., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 6:
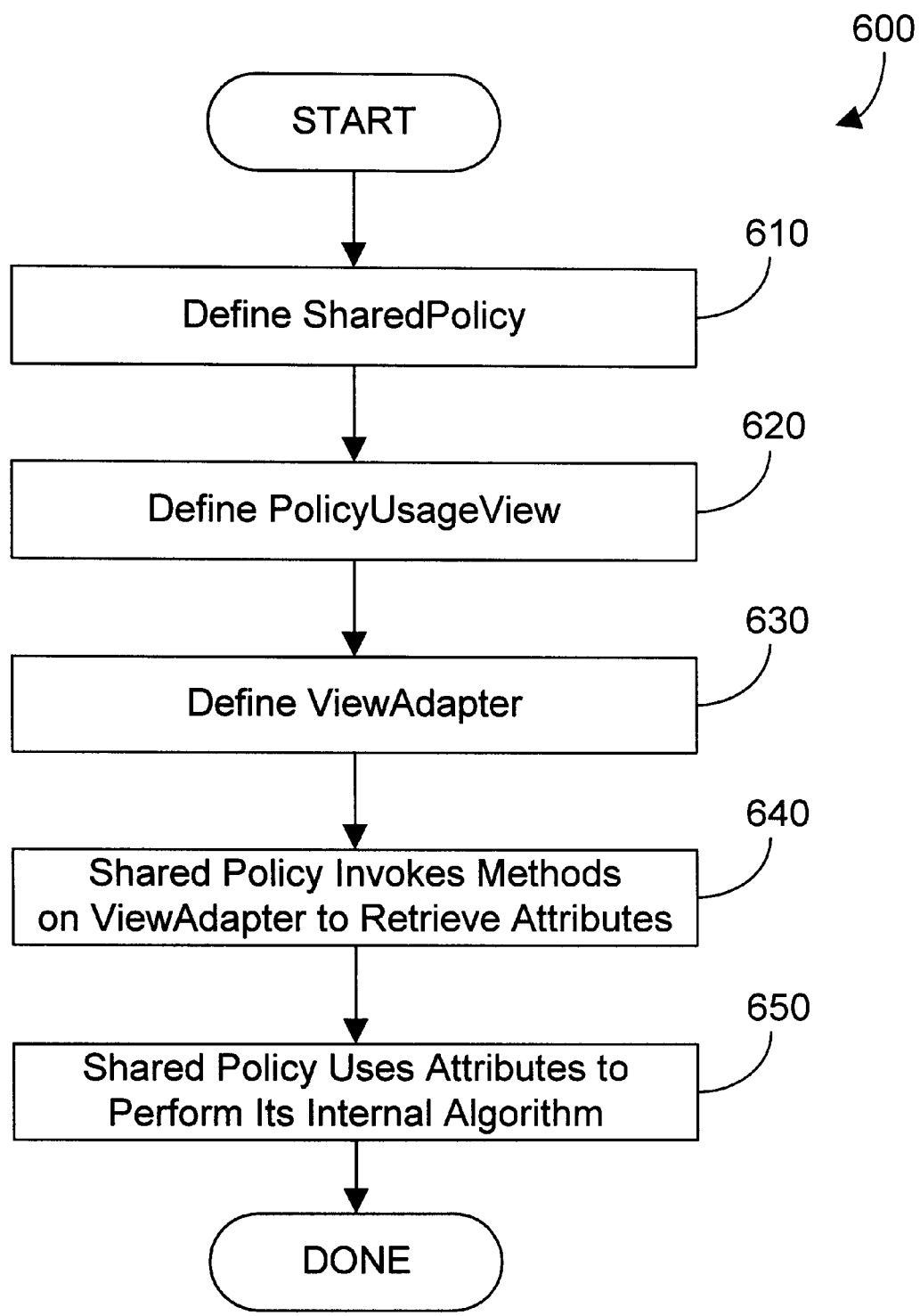
FIG. 6 is a flow diagram showing the steps in providing common behavior to a particular processing level within an object oriented framework.

Referring to FIG. 6, a method 600 provides a common interface for behavior that needs to be accessed at different processing levels in an object oriented framework. First, a SharedPolicy is defined (step 610). The SharedPolicy corresponds to the SharedPolicy class 127 of FIG. 1, which defines some common behavior that is needed at different levels within the framework. For example, in an order processing framework, a calculation of exchange rate may need to be performed at both the order level and at the order detail level. Method 600 allows a single exchange rate calculation to be used at both levels by defining the exchange rate calculation as a shared policy. The next step is to define a PolicyUsageView (step 620), which corresponds to the PolicyUsageView class 128 of FIG. 1. The PolicyUsageView is an abstract class that defines methods to access one or more attributes that are needed by the SharedPolicy. Next, a ViewAdapter is defined (step 630), which is a special adapter that allows the SharedPolicy to access the attributes it requires in a true polymorphic manner. The SharedPolicy then invokes methods on the ViewAdapter (step 640) to retrieve the attributes it requires to perform the algorithm defined by the SharedPolicy, and then uses those attributes to perform its internal algorithm (step 650).

Figure 7:
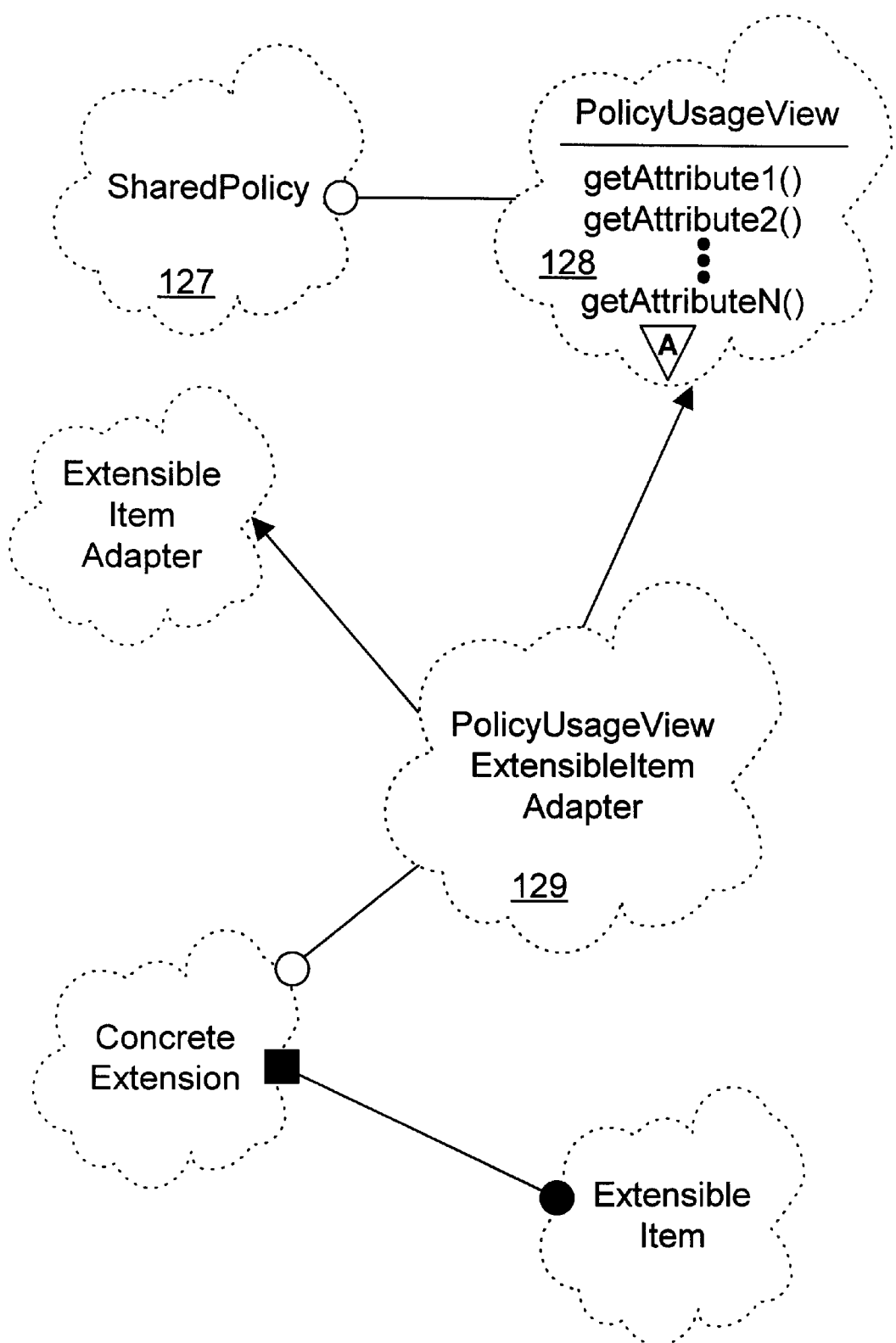
FIG. 7 is a class diagram showing an implementation in accordance with a preferred embodiment of the present invention.

Referring to FIG. 7, a class diagram represents many of the classes and class relationships in accordance with a preferred embodiment of the present invention. The ExtensibleItem class, ConcreteExtension class, and ExtensibleItemAdapter class correspond to the ExtensibleItem class, the Extension class, and the Adapter class shown in FIG. 2. ExtensibleItem contains (or "owns") the ConcreteExtension class, which means that the extensions are contained within and owned by the ExtensibleItem. In addition, the ConcreteExtension class has a "contains by reference" relationship with the ExtensibleItem class, meaning that each Extension references an ExtensibleItem. These relationships between ExtensibleItem and Extension are what define that the ExtensibleItem "owns" its extensions.

The PolicyUsageView class is an abstract class that defines one or more methods for accessing attributes (represented as getAttribute1() through getAttributeN() required by the SharedPolicy. The PolicyUsageViewExtensibleItemAdapter class corresponds to the ViewAdapter class 129 in FIG. 1. PolicyUsageViewExtensibleItemAdapter implements the interface of the ExtensibleItemAdapter class and the PoilcyUsageView class. In addition, PolicyUsageViewExtensibleItemAdapter provides concrete implementations for the getattribute1() through getAttributeN() methods defined in the PolicyUsageView abstract class 128.

SharedPolicy has a "uses" relationship with the PolicyUsageView class, meaning that SharedPolicy may invoked one or more of the getattribute() methods on the PolicyUsageView class. In addition, the ExtensibleItem class has a corresponding ConcreteExtension, which has a "uses" relationship with the PolicyUsageViewExtensibleItemAdapter class. These relationships among the classes of FIG. 7 allow a client to invoke a desired method on an ExtensibleItem, which delegates the desired method to a ConcreteExtension (as shown in FIG. 4), which identifies the corresponding ViewAdapter (such as PolicyUsageViewExtensibleItemAdapter here). The ViewAdapter is passed to the SharedPolicy, which can then invoke the appropriate methods on the PolicyUsageViewExtensibleItemAdapter to perform processing for the shared policy.

Figure 8:
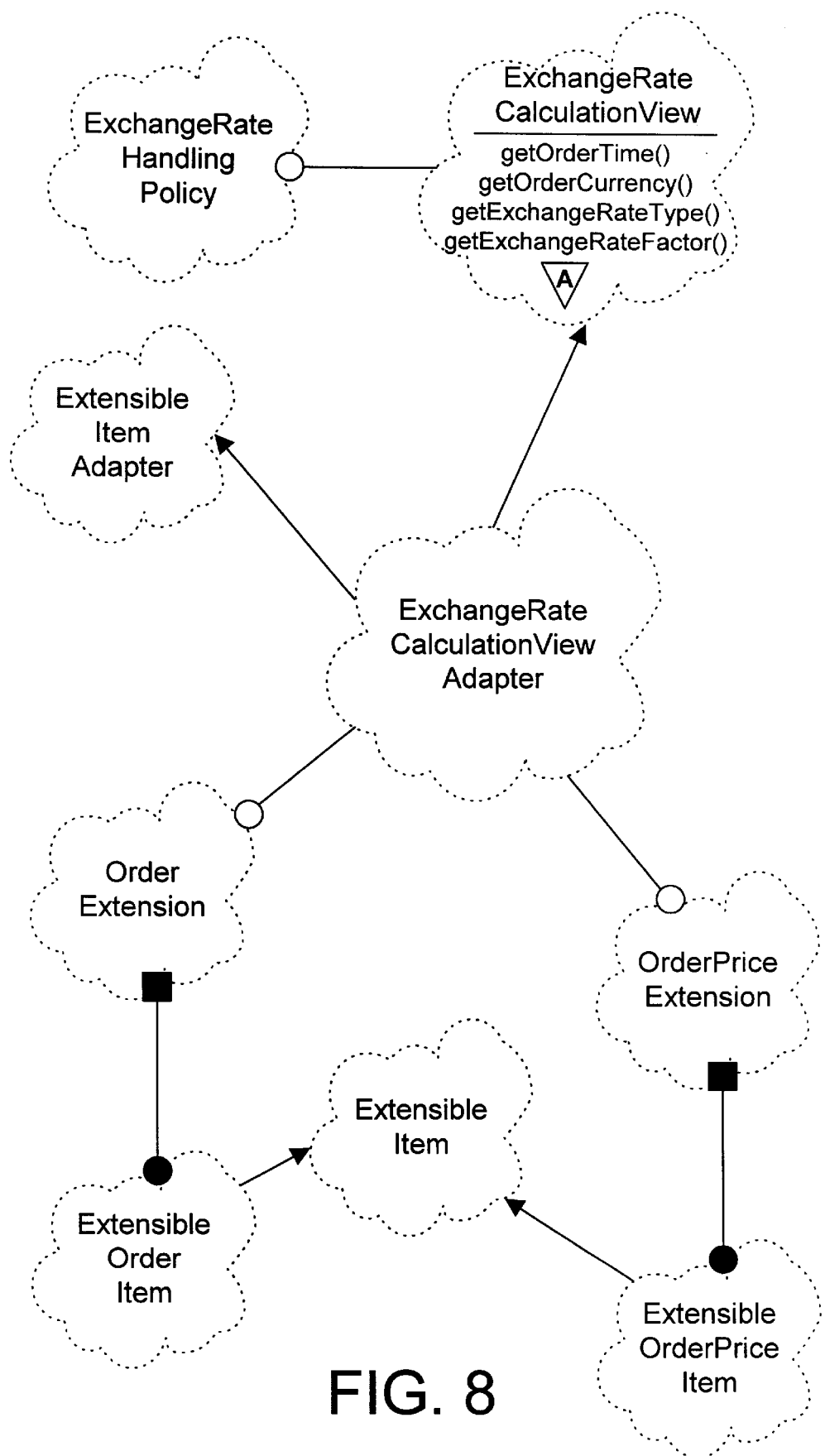
FIG. 8 is a class diagram showing the implementation of FIG. 7 when applied to exchange rate calculation in an order processing framework.

Referring to FIG. 8, a more detailed class diagram shows the particular implementation for an exchange rate calculation in the context of an order processing framework. The ExchangeRateHandlingPolicy class corresponds to the SharedPolicy class 127 of FIG. 7. The ExchangeRateCalculationView abstract class corresponds to the PolicyUsageView class 128 of FIG. 7, and defines abstract methods getOrderTime(), getOrderCurrency(), getExchangeRateType(), and getExchangeRateFactor(). The ExchangeRateCalculationViewAdapter class corresponds to the PolicyUsageViewExtensibleItemAdapter class 129 of FIG. 7. Two different extensible items are shown in FIG. 8, an ExtensibleOrderItem and an ExtensibleOrderPriceItem, which are concrete subclasses of the ExtensibleItem class. The ExtensibleOrderItem owns its corresponding OrderExtension class, and the ExtensibleOrderPriceItem owns its corresponding OrderPriceExtension class. Both the OrderExtension class and the OrderPriceExtension class may use the ExchangeRateCalculationViewAdapter class as a concrete subclass of the ExchangeRateCalculationView to perform exchange rate calculations, even though these classes are at different levels in the framework. This is an example of how two different processing levels in a framework can access the common behavior defined by the framework.

Figure 9:
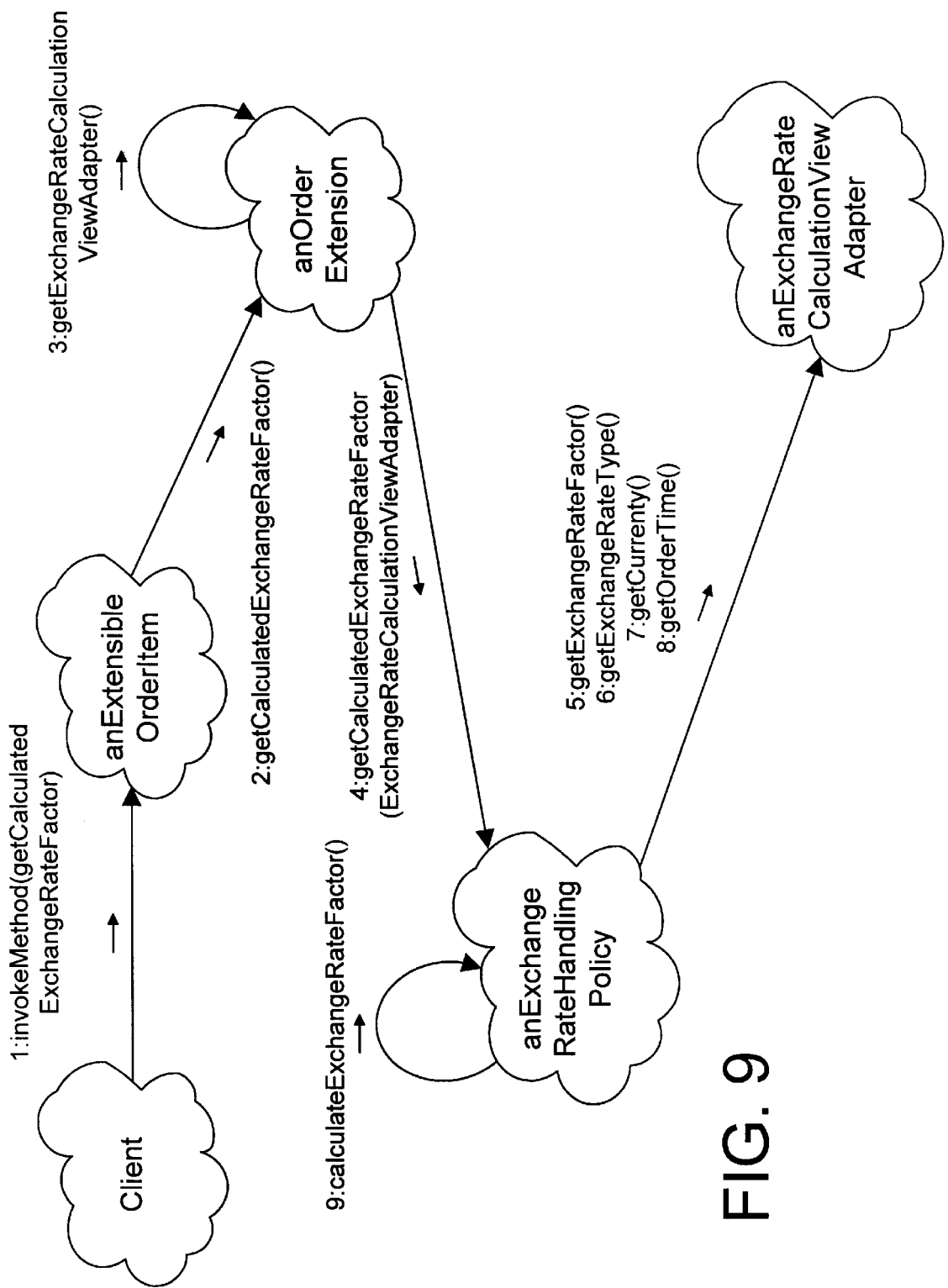
FIG. 9 is an object diagram showing steps for performing an exchange rate calculation using objects that are instances of the classes shown in FIG. 8.

The class diagram of FIG. 8 may be better understood in conjunction with the object interaction diagram of FIG. 9. Referring to FIG. 9, we assume there exists a client program, represented by the Client object, that desires to invoke a selected method called on the anExtensibleOrderItem object. The client calls the invokeMethod() method on anExtensibleOrderItem, specifying the desired method as a parameter. For the specific example of FIG. 9, the client invokes the invokeMethod() method, passing the getCalculatedExchangeRateFactor method as a parameter (step 1). The an ExtensibleItem object delegates the getCalculatedExchangeRateFactor() method to one of its extensions, represented in FIG. 9 as anOrderExtension (step 2). Assuming that anOrderExtension is the extension that defines the getCalculatedExchangeRateFactor() method, the anOrderExtension object invokes its own getExchangeRateCalculationViewAdapter() method to determine which view adapter corresponds to the requested method (step 3). This view adapter is then passed to the anExchangeRateHandlingPolicy object as a parameter to the getCalculatedExchangeRateFactor() method (step 4). The anExchangeRatePolicy object then invokes the appropriate methods on the anExchangeRateCalculationViewAdapter (steps 5–8) to retrieve the appropriate attributes for calculating the exchange rate, such as the exchange rate factor, the exchange rate type, the currency, and the order time. These attributes are returned by the anExchangeRateCalculationViewAdapter object to the anExchangeRateHandlingPolicy object, which then calculates the appropriate exchange rate using these attributes (step 9). The present invention thus provides a way for different processing levels in a framework to access common behavior in the framework.

The classes, objects, methods, and class relationships that provide common behavior across different processing levels in an object oriented framework in accordance with the present invention collectively comprise means for providing common behavior across different processing levels in an object oriented framework.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   (1) at least one processor;
   (2) a memory coupled to the at least one processor;
   (3) an object oriented framework mechanism residing in the memory, the object oriented mechanism including:
      (A) an extensible item class that defines at least one extensible item object;
      (B) an abstract extension class that defines at least one extension object that is owned by the extensible item object, the abstract extension class further defining an interface for the extensible item object;
      (C) an extensible item adapter class that defines at least one extensible item adapter object that corresponds to the extensible item object;
      (D) a shared policy class that defines at least one shared policy object that corresponds to a behavior that is needed at different processing levels of the framework mechanism;
      (E) a policy usage view abstract class that defines at least one method for accessing at least one attribute required by the behavior; and
      (F) a view adapter class that implements the interface of the policy usage view class and that implements the interface of the extensible item adapter class, the view adapter class defining at least one view adapter object that provides at least one concrete implementation of the at least one method for accessing the at least one attribute required by the behavior.

2. A method for providing common behavior to different processing levels in an object oriented framework, the method comprising the steps of:
   providing an extensible item class that defines at least one extensible item object;
   providing an abstract extension class that defines at least one extension object that is owned by the extensible item object, the abstract extension class further defining an interface for the extensible item object;
   providing an extensible item adapter class that defines at least one extensible item adapter object that corresponds to the extensible item object;
   providing a shared policy class that defines at least one shared policy object that corresponds to a behavior that is needed at different processing levels of the framework mechanism;
   providing a policy usage view abstract class that defines at least one method for accessing at least one attribute required by the behavior;
   providing a view adapter class that implements the interface of the policy usage view abstract class and that implements the interface of the extensible item adapter class, the view adapter class defining at least one view adapter object that provides at least one concrete implementation of the at least one method for accessing the at least one attribute required by the behavior; and
   each different processing level accessing the behavior by invoking the at least one method on the view adapter object.

3. A program product comprising:
   (1) an object oriented framework mechanism including:
      (A) an extensible item class that defines at least one extensible item object;
      (B) an abstract extension class that defines at least one extension object that is owned by the extensible item object, the abstract extension class further defining an interface for the extensible item object;
      (C) an extensible item adapter class that defines at least one extensible item adapter object that corresponds to the extensible item object;
      (D) a shared policy class that defines at least one shared policy object that corresponds to a behavior that is needed at different processing levels of the framework mechanism;
      (E) a policy usage view abstract class that defines at least one method for accessing at least one attribute required by the behavior;

(F) a view adapter class that implements the interface of the policy usage view abstract class and that implements the interface of the extensible item adapter class, the view adapter class defining at least one view adapter object that provides at least one concrete implementation of the at least one method for accessing the at least one attribute required by the behavior; and (2) signal bearing media bearing the framework mechanism.

4. The program product of claim 3 wherein the signal bearing media comprises recordable media.

5. The program product of claim 3 wherein the signal bearing media comprises transmission media.

* * * * *